US012308198B2

(12) United States Patent
Pantha et al.

(10) Patent No.: US 12,308,198 B2
(45) Date of Patent: May 20, 2025

(54) LATTICE MATCHED PHOTOCATHODES FOR EXTENDED WAVELENGTHS

(71) Applicant: L3Harris Technologies, Inc., Melbourne, FL (US)

(72) Inventors: Bed Pantha, Chandler, AZ (US); Jacob J. Becker, Gilbert, AZ (US); Jon D. Burnsed, Tempe, AZ (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 231 days.

(21) Appl. No.: 17/992,721

(22) Filed: Nov. 22, 2022

(65) Prior Publication Data

US 2024/0170247 A1 May 23, 2024

(51) Int. Cl.

| | |
|---|---|
| ***H01J 29/04*** | (2006.01) |
| ***H01J 1/34*** | (2006.01) |
| ***H01J 29/38*** | (2006.01) |
| ***H01J 31/50*** | (2006.01) |

(52) U.S. Cl.

CPC ................ *H01J 29/04* (2013.01); *H01J 1/34* (2013.01); *H01J 29/38* (2013.01); *H01J 31/50* (2013.01); *H01J 2201/3423* (2013.01)

(58) Field of Classification Search

CPC .... H01J 29/04; H01J 29/38; H01J 1/34; H01J 31/50; H01J 31/507; H01J 2201/3423; H01J 9/12

See application file for complete search history.

(56) References Cited

U.S. PATENT DOCUMENTS

| | | | | |
|---|---|---|---|---|
| 3,958,143 | A | 5/1976 | Bell | |
| 4,929,867 | A | 5/1990 | Costello et al. | |
| 5,268,570 | A | 12/1993 | Kim | |
| 5,404,026 | A * | 4/1995 | Mariella, Jr. ............. | H01J 1/34 257/11 |

(Continued)

FOREIGN PATENT DOCUMENTS

| | | | |
|---|---|---|---|
| CN | 103903939 | B | 7/2016 |
| EP | 0345086 | A1 | 12/1989 |
| GB | 1427209 | A | 3/1976 |

OTHER PUBLICATIONS

"Metamaterial photocathode for infrared image intensifier", Retrieved from https://techlinkcenter.org/technologies/metamaterial-photocathode-for-infrared-image-intensifier/7927eb70-db47-496a-92ed-7428b1f41a98, Retrieved on Sep. 30, 2022, 4 pages.

(Continued)

*Primary Examiner* — Anne M Hines
*Assistant Examiner* — Jose M Diaz
(74) *Attorney, Agent, or Firm* — NIXON & VANDERHYE P.C.

(57) ABSTRACT

A photocathode epitaxial structure. The photocathode epitaxial structure includes a binary compound substrate material. The photocathode epitaxial structure further includes an active device absorber layer forming a portion of a p-type device photocathode formed on the binary compound substrate material. The active device absorber layer comprising at least a quaternary or greater material structure configured to be lattice matched with the substrate material to reduce strain to allow charge carriers to go further in the active device absorber layer implemented in the photocathode of a nightvision system.

20 Claims, 5 Drawing Sheets

(56) References Cited

U.S. PATENT DOCUMENTS

| | | | | |
|---|---|---|---|---|
| 5,610,078 | A | 3/1997 | Estrera et al. | |
| 5,912,500 | A | 6/1999 | Costello et al. | |
| 6,558,973 | B2 | 5/2003 | Johnson et al. | |
| 7,457,338 | B2 | 11/2008 | Mawst et al. | |
| 9,768,339 | B2 | 9/2017 | Yanka et al. | |
| 10,355,159 | B2 | 7/2019 | Misra et al. | |
| 2004/0056279 | A1 | 3/2004 | Niigaki et al. | |
| 2008/0042563 | A1* | 2/2008 | Niigaki | H01J 31/48<br>313/542 |
| 2021/0399153 | A1 | 12/2021 | Dowd et al. | |

OTHER PUBLICATIONS

Escher et al., "Photoelectric imaging in the 0.9-1.6 micron range", IEEE Electron Device Letters, vol. 2, Issue 5, May 1981, 123-125.

Estrera et al., "Development of extended red (1.0- to 1.3- μm) image intensifiers", SPIE's 1995 International Symposium on Optical Science, Engineering, and Instrumentation, 1995, vol. 2551.

Guo et al., "Near-infrared photocathode In0.53Ga0.47As doped with zinc: A first principle study", Optik, vol. 127, Issue 3, Feb. 2016, pp. 1268-1271.

Guo et al., "Theoretical study on electronic and optical properties of In0.53Ga0.47As (1 0 0) ß2 (2×4) surface", Applied Surface Science, vol. 288, Jan. 1, 2014, pp. 238-243.

Miller et al., "EMCORE four-junction inverted metamorphic solar cell development", AIP Conference Proceedings, vol. 1616, 2014, 5 Pages.

Muchun et al., "Photoemission behaviors of transmission-mode InGaAs photocathode", Proceedings of the SPIE, vol. 9270, 2014, 6 Pages.

Sachno et al., "Image intensifier tube (12) with 1.06- μm InGaAs-photocathode", 18th International Conference on Photoelectronics and Night Vision Devices and Quantum Informatics, 2004, vol. 5834, 7 Pages.

Xu et al., "Numerical simulation study on quantum efficiency characteristics of InP/InGaAs/InP infrared photocathode" International Symposium on Optoelectronic Technology and Application, 2016, vol. 10157, 8 Pages.

Yang et al., "Spectral response of InGaAs photocathodes with different emission layers", Applied Optics vol. 55, Issue 31, pp. 8732-8737, 2016.

Zhenhui et al., "Simulation of InP/In0.53Ga0.47As/InP infrared photocathode with high quantum yield", Infrared and Laser Engineering, 2019, 7 Pages.

European Search Report received for EP Patent Application No. 23208065.5, mailed on Apr. 4, 2024, 10 pages.

* cited by examiner

LATTICE MATCHED PHOTOCATHODES FOR EXTENDED WAVELENGTHS

BACKGROUND

Background and Relevant Art

Nightvision systems allow a user to see in low-light environments without external human visible illumination. This allows for covert vision in a low-light environment to prevent flooding the environment with human visible light.

Some nightvision systems function by receiving low levels of light reflected off of, or emitted from objects and providing that light to an image intensifier (sometimes referred to as $I^2$). The image intensifier has a photocathode. When photons strike the photocathode, electrons are emitted into a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic, to an eyepiece where the user can directly view the illuminated phosphor screen, thus allowing the user to see the objects.

Spectral response from the state-of-the-art Gen III (GaAs) photocathodes cuts off at around 900 nm. In particular, these state-of-the-art systems have been implemented using photocathodes formed using ternary materials (e.g., InGaAs) formed on binary substrates (e.g., GaAs). This results in lattice mismatches, which causes strain, resulting in reduced imaging performance that corresponds to the longer wavelength sensitivity and which places practical limits on photocathode wavelength ranges described above.

This may be satisfactory for implementing devices configured to observe objects that would normally be visible to humans in lighted conditions. However, this spectrum cutoff may be unsuitable for other uses. For example, it may be useful to have a device that functions with wavelengths up to a 1550 nm. This wavelength is particularly useful as it is a commonly used wavelength suitable for high-power, eyesafe lasers for manufacturing long-range rangefinders and/or laser guidance and laser painting systems. Thus, if a user desires to have a traditional nightvision system that also allows for viewing certain laser-based systems, this may not be possible with current technology. To the extent that current systems are able to function up to 1550 nm, those systems are generally manufactured using inferior manufacturing techniques which may reduce sensitivity overall, or at least portions of, the usable spectrum.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a photocathode epitaxial structure. The photocathode epitaxial structure includes a binary compound substrate material. The photocathode epitaxial structure further includes an active device absorber layer forming a portion of a p-type device photocathode formed on the binary compound substrate material. The active device absorber layer comprising at least a quaternary or greater compound semiconductor material structure configured to be adequately (i.e., remains unrelaxed) lattice matched with the substrate material to reduce strain, allowing charge carriers to go further in the active device absorber layer implemented in the photocathode of a nightvision system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein implement photocathodes using material systems for the photocathodes that minimize strain by having a different lattice constant than previous systems. In particular material systems are selected to match the lattice constant of the substrate with the photocathode. More specifically, embodiments are implemented where the photocathode epitaxial layers lattice match the substrate lattice.

For example, previously a GaInAs absorber of a photocathode on a GaAs substrate is limited in wavelength sensitivity range due to significant performance reduction as the range extends much beyond about 900 nm. However, switching to a particular quaternary or pentanary system allows to customize the materials to achieve longer wavelengths (or lower bandgap) of the absorber of the photocathode and lattice matching condition at the same time. In particular, embodiments can vary a bandgap of the material from about 1.4 to 0.7 eV at 300 Kelvin allowing for extended spectrum as compared to previous photocathode materials. Note that while it is desirable to achieve a low bandgap, it may be desirable to not have the bandgap be below some predetermined lower threshold. In particular, embodiments illustrated below implement Cs—O activation that may not function correctly below certain threshold bandgaps. As noted below, in some embodiments, this lower bandgap threshold can be enforced by forming a thin (e.g., 5 nm GaAs or InP) layer on the active device absorber layer and forming the Cs—O layer on the thin GaAs or InP layer.

Such processing is advantageous in that it may reduce Equivalent Background Illumination (EBI) and increase Quantum Efficiency (QE). In some embodiments, this is used to tailor bandgap and photocathode composition to meet particular specifications. For example, some embodiments are implemented having spectrum sensitivity between 1064 nm to 1200 nm. Other embodiments have even longer wavelength sensitivity.

Figure 1:
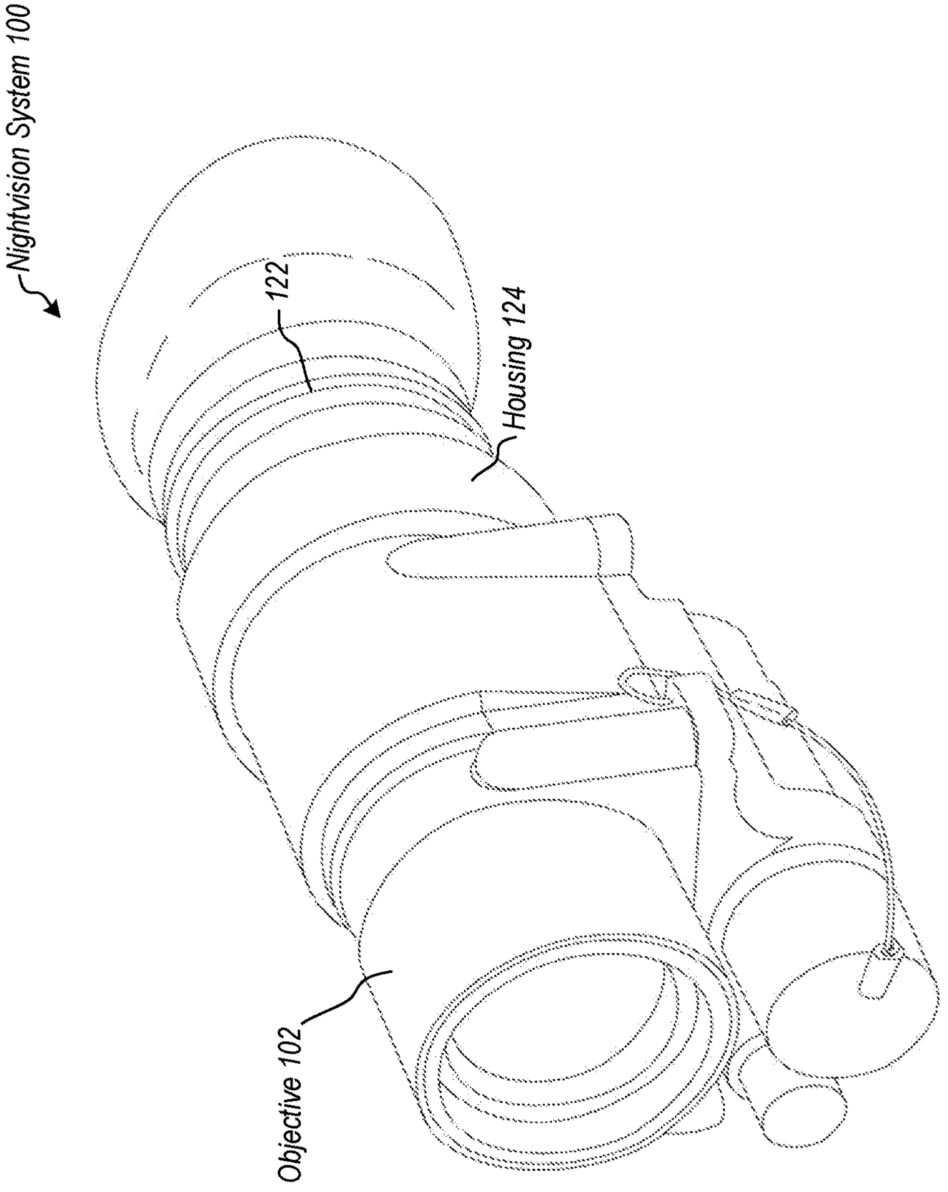
FIG. 1 illustrates an example nightvision system.

Additional details are illustrated. Attention is now directed to FIG. 1, where a specific example of a nightvision system is illustrated. In particular, FIG. 1 illustrates the PVS—14 nightvision system 100. In the example illustrated, the nightvision system 100 includes a housing 124. As will be illustrated in more detail below in other figures, the housing 124 houses an image intensifier and various other components. The nightvision system 100 further includes an objective 102 which receives weak light reflected and/or generated in an environment. The objective 102 includes optics such as lenses, waveguides, and/or other optical components for receiving and transmitting light to an image intensifier, discussed in more detail below. The nightvision system 100 further includes an eyepiece 122. The eyepiece 122 includes optics for directing images created by the nightvision system 100, including images created by an image intensifier and images created by a transparent optical device, into the eye of the user.

Figure 2:
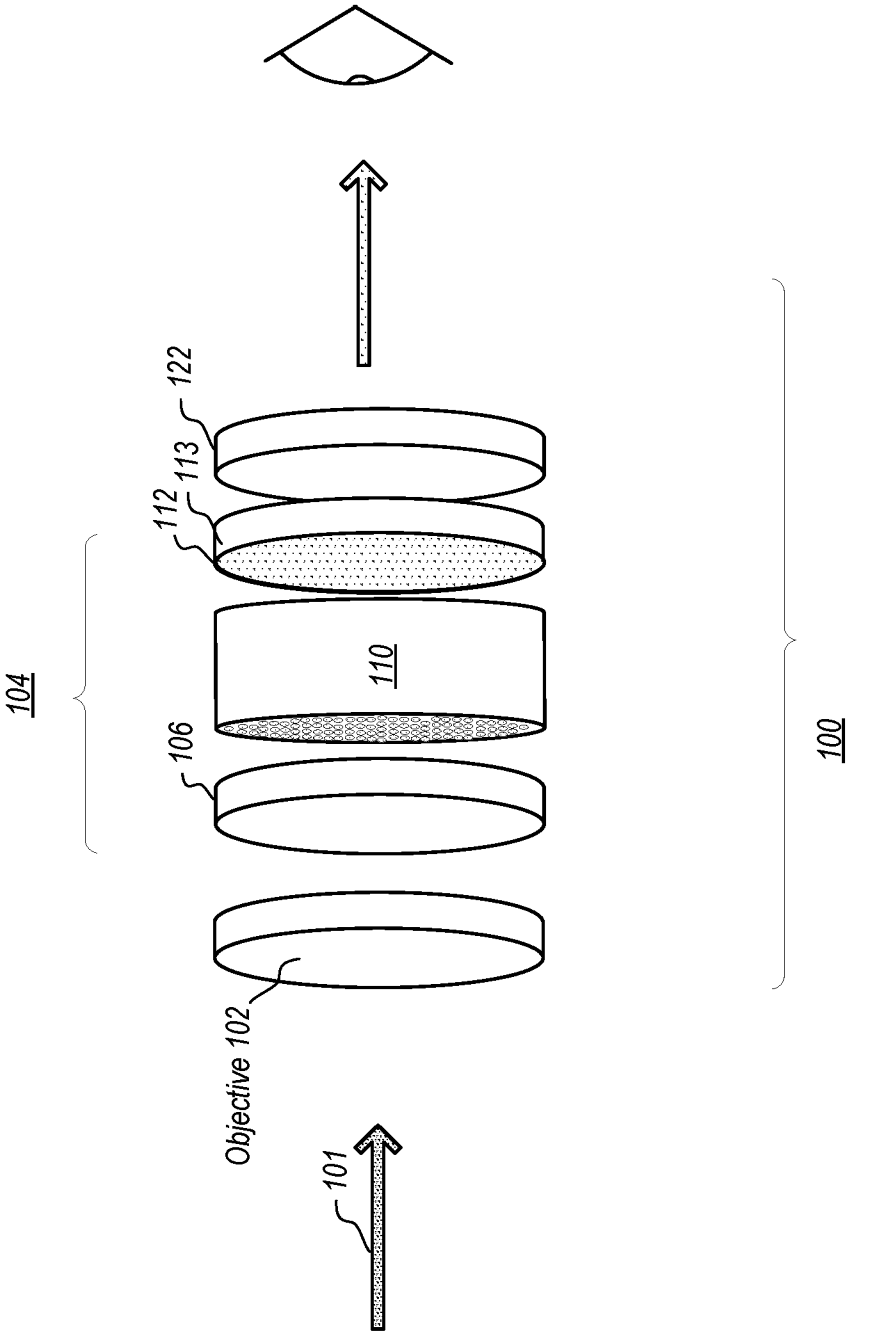
FIG. 2 illustrates a block diagram of portions of a nightvision system.

Attention is now directed to FIG. 2. FIG. 2 illustrates a block diagram of one embodiment of the invention. A nightvision system typically includes an objective 102 to focus input light 101 into an image intensifier 104. Input light 101 may be, for example, from ambient sources, such as light from heavenly bodies such as stars, the moon, or even faint light from the setting sun. Additionally, or alternatively, ambient sources could include light from buildings, automobiles, or other faint sources of light that cause reflection of light from an object being viewed in a nightvision environment into the objective. A second source of light may be light being emitted from an external source towards an object, reflected off the object, and into the objective. For example, the source may be an infrared source that is not viewable in the viewable spectrum for human observers. For example, in some embodiments, laser guidance and painting systems may direct laser light at objects for designation and/or targeting. A third source of light may be light emitted by an object itself. For example, this may be related to visible light, infrared heat energy emitted by the object and directed into the objective, etc. Nonetheless, the nightvision system is able to convert the light emitted from the source into a viewable image for the user.

The objective directs input light 101 into the image intensifier 104. Note that the image intensifier 104 may include functionality for amplifying light received from the objective to create a sufficiently strong image that can be viewed by the user. This may be accomplished using various technologies. In the example of FIG. 2, a photocathode 106, a microchannel plate 110, and a phosphor screen 112 are used. The photocathode 106 generates photo electrons in response to incoming photons. Electrons from the photocathode 106 are emitted into the microchannel plate 110. Electrons are multiplied in the microchannel plate 110.

Electrons are emitted from the microchannel plate 110 to a phosphor screen 112 which glows as a result of electrons striking the phosphor screen 112. This creates a monochrome image from the input light 101.

A fiber-optic 113 carries this image as intensified light to the eyepiece (such as eyepiece 122 illustrated in FIG. 1 of a nightvision system where it can be output to the user. This fiber-optic 113 can be twisted 180 degrees to undo the inversion caused by the system objective to allow for convenient direct viewing of the phosphor screen 112.

Figure 3:
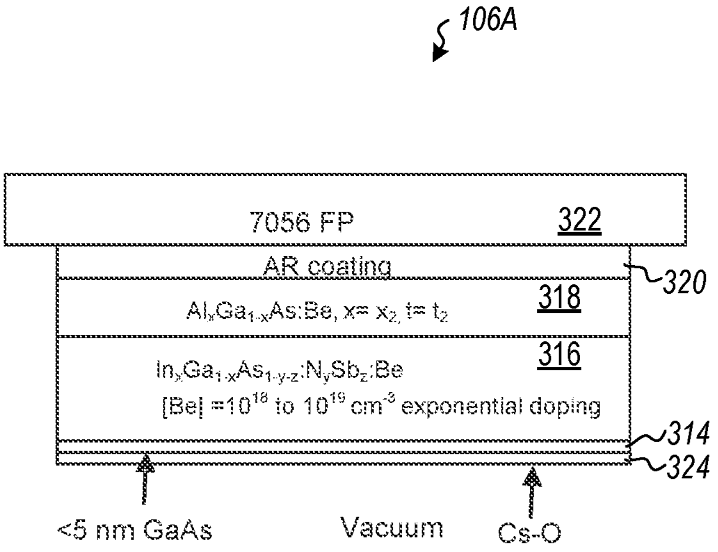
FIG. 3 illustrates a lattice matched extended-photocathode.
Figure 5:
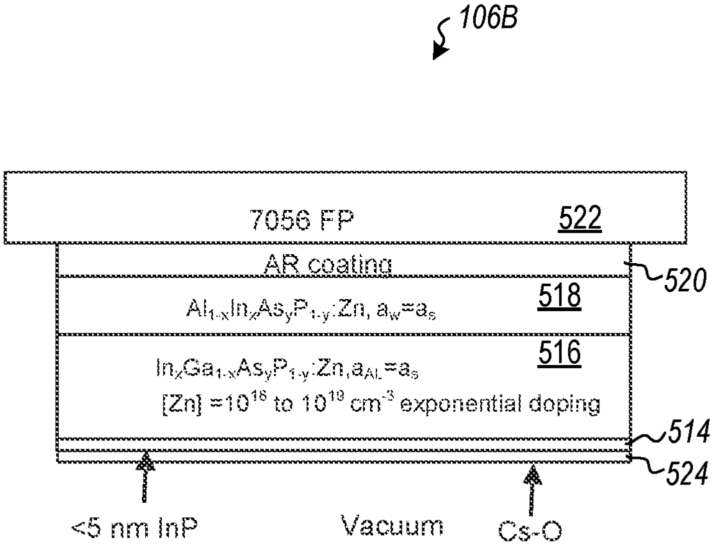
FIG. 5 illustrates a-lattice matched extended-photocathode.

Embodiments may be implemented with an improved photocathode such as, for example, photocathode 106A illustrated in FIG. 3 or photocathode 106B as illustrated in FIG. 5. An improved photocathode may be manufactured to be sensitive to a broader spectrum of light as compared to previous GaAs designs.

In the example illustrated in FIG. 3, lattice-matched pentanary dilute nitride InGaAsNSb is used to form the active device absorber layer 316 of the photocathode 106A. Using this chemistry, embodiments can vary the bandgap of the active device absorber layer 316 from 1.4 to 0.7 eV at 300 Kelvin. In this way, laser grade quality absorber layers can be grown by molecular beam epitaxy (MBE). In some embodiments, post growth annealing is used to recover dilute nitride from nitrogen related defects. In some embodiments, the nitrogen concentration is between approximately 2 to 5%. However, satisfactory embodiments may be implemented with up to 10% nitrogen concentration. In the illustrated example, the Sb concentration is less than 0.5%

Note that the bandgap can be fine-tuned to optimize tradeoffs between photo-response, spectral response, and EBI. Note that Pentanary alloys or dilute nitride bandgap can be tuned to support 900 nm to 1550 nm wavelengths.

Figure 4:
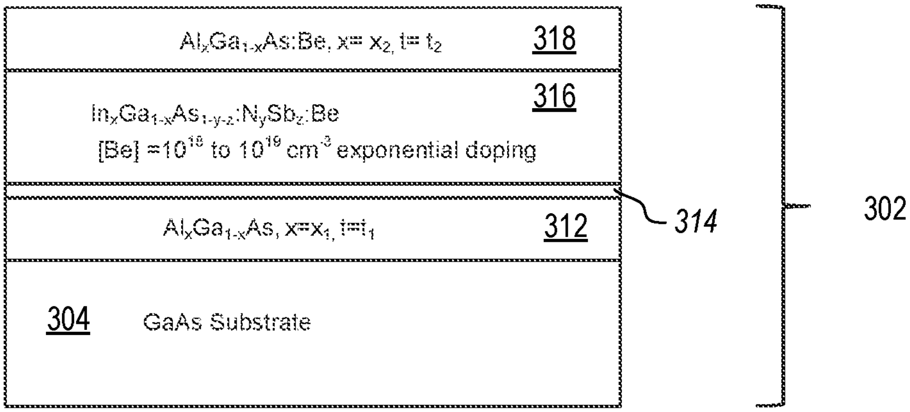
FIG. 4 illustrates an improved epitaxial structure for forming an improved photocathode.

FIG. 4 illustrates an epitaxial structure used to form the photocathode 106A. In particular, FIG. 4 illustrates an epitaxial structure 302 used to manufacture the photocathode 106A. FIG. 4 illustrates that a GaAs substrate 304 is used. For example, a commercially available GaAs wafer may be obtained and the other layers of the epitaxial structure 302 may be formed on the GaAs wafer.

FIG. 4 illustrates an etch stop layer 312 formed on the GaAs substrate 304. Etch stop layer 312, in this example, is an AlGaAs etch stop layer. Note that the etch stop layer 312 can use any suitable etch stop material. For example, in some embodiments, the etch stop layer may be In(Al)GaP or InAlAs. The GaAs substrate 304 will be selectively removed by predetermined wet chemistries followed by this etch stop layer 312 with different wet chemistries. Using chemistries used in phosphide etch stop processes is advantageous with respect to reducing or eliminating etch residues left on surface by other etch chemistries. Further, such chemistries will not partially etch the active layer of the active device absorber layer 316. Having phosphide etch stop layers allows for exceptionally selective chemistries between the two different types of materials (Arsenide and Phosphide). Therefore, the atomic layers at the surface of absorber will retain their epitaxial quality. High surface quality includes characteristics such as being free of etch residues and having no added surface roughness due to an etch stop removal process. Therefore, the etch stop layer 312 is used to create a damage free or pristine surface of the absorber or the layer on which Cs—O monolayers 324 are deposited (where deposition of such layers is known as an activation process)

in ultra-high vacuum conditions. Activation in a pristine surface will minimize the losses of photogenerated electrons arriving at the surface by interface trap states and hence will reduce Equivalent Background Illumination (EBI). The etch stop layer 312 may have, for example, a nominal thickness of about 2000 A. FIG. 4 further illustrates a GaAs fully strained layer 314. In some embodiments, the GaAs fully strained layer 314 serves as a substrate for forming the active device absorber layer 316. The thickness of this GaAs fully strained layer 314 may be determined by the indium percentage in the active device absorber layer 316. Alternatively, the thickness is a predetermined thickness which is typically in the range of ~5 nm. Being a higher bandgap of GaAs (with respect to the band gap of the active device absorber layer 316), this GaAs fully strained layer 314 acts as a barrier for thermally generated electrons but freely passes energetic photogenerated electrons (in the active device absorber layer 316) through a quantum tunneling process on their way to the vacuum. Thus, this is another approach to minimize the EBI. In such case, Cs—O is deposited on this GaAs fully strained layer 314, as illustrated by the Cs—O layer 324. Since this GaAs fully strained layer 314 is thin (typically ~5 nm), the etch stop layer (312) is selected in such a way that etch chemistries should be highly selective. The etch stop layer (312) can be selected so that process control can be realistically achieved.

FIG. 4 illustrates the active device absorber layer 316 and a window layer 318. The active device absorber layer 316 of the photocathode is a bulk layer having been fabricated to instill certain properties in the active device absorber layer 316. Such properties may be, for example, optical properties allowing for detection of certain optical wavelengths. That is, a target band gap is selected, and an appropriate amount of various materials are included to achieve the target band gap. In some embodiments, P-type doping is achieved by incorporating Zinc (Zn) atoms or beryllium (Be) during epitaxial forming processes via chemical vapor deposition process using a Be precursor. In some embodiments, Be doping is used instead of Zn doping particularly when the active device absorber layer 316 is processed using MBE.

The doping in the active device absorber layer 316 is designed in some embodiments, in such a way that it creates a linear internal electric field across the active device absorber layer 316 thickness. Be doping is exponentially increased as the thickness of absorber layer 316 increases, such that highest doping occurs at an interface to the window layer 318 with doping increasing away from an interface between the active device absorber layer 316 and the GaAs fully strained layer 314. A typical doping range is $10^{18}$ to $10^{19}$ atoms per cubic centimeter. In some embodiment, the doping range can be designed from $1\times10^{17}$ to $5\times10^{19}$ atoms per cubic centimeter range. The internal electric filed will accelerate the photogenerated electrons toward the vacuum thereby increasing the quantum efficiency of the photocathode 106A. For example, in some embodiments, the composition of In, Ga, and N is chosen such that it creates a lattice matched photocathode that is sensitive to light which includes 1064 nm wavelengths. This may be useful in 1064 nm laser applications. These lasers can be used for medical purposes to remove lesions and tumors. Alternatively, these lasers can be used for cutting and/or etching. These lasers can be used for flow visualizations. These lasers can be used for laser rangefinders and/or laser guidance and laser painting systems.

Alternatively or additionally, embodiments may implement the active device absorber layer 316 having a near infrared spectrum of 900-1700 nm. This spectrum can be useful for laser range finders and designators as well as observation and detection of celestial bodies.

Alternatively or additionally, embodiments may implement the active device absorber layer 316 having a spectrum of 1.7 to 3 um. This is one spectrum that has been referred to as short wave infrared. Note that this is a useful spectrum and represents the limit of systems that can use glass optics as glass optics become non-functional above 3 um.

Unlike photodiodes (which are PN junction devices), T-mode photocathodes, such as the active device absorber layer 316 include only p-type bulk layers.

The active device absorber layer 316 may be formed via any practicable growth, deposition, or/or other process.

FIG. 4 further illustrates the window layer 318. A window layer 318 is a doped protective layer that protects the active device absorber layer 316. In particular, the window layer 318 provides passivation to prevent corrosion of the active device absorber layer 316 and this layer also provides and energy barrier to electrons preventing photogenerated electrons from diffusing away from the vacuum surface and recombining at the opposite side of the active layer. Note that while the window layer 318 is shown as an Arsenide type window layer, in some embodiments, a Phosphide window layer may be used to provide for better passivation than an Arsenide type window layer. The window layer 318 is doped such that it has a large band gap so as to not absorb light that is intended to reach the active device absorber layer 316. In some embodiments, the window layer 318 may be designed so as to reduce reflectivity of the active device absorber layer 316 to allow for more light to be absorbed by the active device absorber layer 316 than if a more reflective surface were present on the active device absorber layer 316. In some embodiments the window layer may be $In_{0.48}Ga_{0.52}P$ or InAlP or AlInGaP lattice matched to GaAs. A phosphide window can provide better passivation than arsenide window layer.

Returning once again to FIG. 3, various finishing elements are illustrated. In particular, FIG. 3 illustrates that that an antireflective coating 320 is added over the window layer 318. A faceplate 322 is bonded to the photocathode. The faceplate 322, in this example is Corning 7056 glass. FIG. 3 further illustrates complete removal of GaAs substrate. This may be performed by etching, grinding, and/or other processes.

FIG. 3 illustrates that a Cs—O layer 324 may be added to create a negative electron affinity (NEA) surface. In an alternative embodiment, $Cs_2Te$ or CsF ($CsNF_3$ instead of Cs—O) may be used in place of Cs—O.

In some embodiments, the optional GaAs fully strained layer 314 may be added for better Cs—O activation and for electrons to tunnel though. In some embodiments, the optional GaAs layer is thinner than 5 nm. This thin GaAs layer acts as 1) a barrier for thermally generated electrons but passes energetic photogenerated electrons toward the vacuum via a quantum tunneling process; and 2) leverage to use known surface cleaning and activation processes to make a negative electron affinity (NEA) cathode. This layer is completely strained and sufficiently thin. Sufficiently thin means that photogenerated electrons can tunnel through this layer. The thickness of this layer can range from 2 nm to 10 nm.

Figure 6:
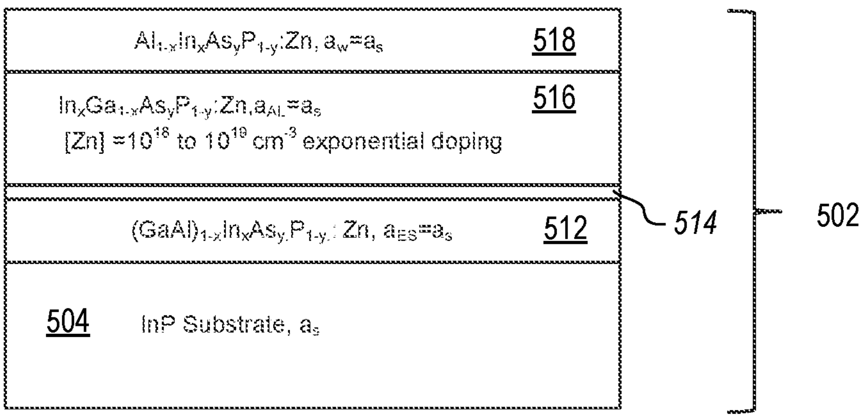
FIG. 6 illustrates an epitaxial structure for forming a lattice matched extended-photocathode.

In the example illustrated in FIG. 5, lattice-matched quaternary III-V material structures are used to form the active device absorber layer 516 of the photocathode 106A. the active device absorber layer 516 of the photocathode 106B can be grown on an InP substrate 504 (see FIG. 6). Using this chemistry, embodiments can vary the bandgap of the active device absorber layer 516 from 1.35 to 0.70 eV at 300 Kelvin. In this way, laser grade quality absorber layers can be grown by either metal organic chemical vapor deposition (MOCVD) or MBE.

Note that the bandgap can be fine-tuned to optimize tradeoffs between photo-response, spectral response range, and EBI. Note that III-V quaternary alloys can be tuned to support 930 nm to at least 1550 nm wavelengths.

FIG. 6 illustrates an epitaxial structure used to form the photocathode 106B. In particular, FIG. 6 illustrates an epitaxial structure 502 used to manufacture the photocathode 106B. FIG. 6 illustrates that a InP substrate 504 is used. For example, a commercially available InP wafer may be obtained and the other layers of the epitaxial structure 502 may be formed on the InP wafer.

FIG. 6 illustrates an etch stop layer 512 formed on the InP substrate 504. etch stop layer 512, which in this example is an $In_{0.53}Ga_{0.47}A$ etch stop layer. Note that the etch stop layer 512 can use any suitable etch stop material can be used. For example, in some embodiments, the etch stop layer may be lattice matched arsenide-phosphide (As—P) or InAlAs. The InP substrate 504 will be selectively removed by predetermined wet chemistries followed by this etch stop layer 512 with different wet chemistries. The etch stop layer 512 may have, for example, a nominal thickness of about 200 nm. FIG. 6 further illustrates a fully strained InP layer 514. In some embodiments, the fully strained InP layer 514 serves as a substrate for forming the active device absorber layer 516. The thickness of this fully strained InP layer 514 may be determined by the indium percentage in the active device absorber layer 516. Alternatively, the thickness is a predetermined thickness which is typically in the range of ~5 nm. Being a higher bandgap of InP (with respect to the band gap of the active device absorber layer 516), this fully strained InP layer 514 acts as a barrier for thermally generated electrons but freely passes energetic photogenerated electrons (in the active device absorber layer 516) through a quantum tunneling process on their way to the vacuum. Thus, this is another approach to minimize the EBI. In such case, Cs—O is deposited on this fully strained InP layer layer 514, as illustrated by the Cs—O layer 524. Since this fully strained InP layer 514 is thin (typically ~5 nm), the etch stop layer (512) is selected in such a way that etch chemistries should be highly selective. The etch stop layer (512) can be selected so that process control can be realistically achieved.

FIG. 6 illustrates the active device absorber layer 516 and a window layer 518. The active device absorber layer 516 of the photocathode is a bulk layer having been fabricated to instill certain properties in the active device absorber layer 516. Such properties may be, for example, optical properties allowing for detection of certain optical wavelengths. That is, a target band gap is selected, and an appropriate amount of various materials are included to achieve the target band gap. In some embodiments, P-type doping is achieved by incorporating Zinc (Zn) atoms or beryllium (Be) during epitaxial forming processes via chemical vapor deposition process using a Be precursor. In some embodiments, Be doping is used instead of Zn doping particularly when the active device absorber layer 516 is processed using MBE.

The doping in the active device absorber layer 516 is designed in such a way that it creates a linear internal electric field across the active device absorber layer 516 thickness. Zn doping is exponentially increased as the thickness of active device absorber layer 516 increases, such that highest doping occurs at an interface to the window layer 518 with doping increasing away from an interface between the active device absorber layer 516 and the fully strained InP layer 514. A typical doping range is $10^{18}$ to $10^{19}$ atoms per cubic centimeter. In some embodiment, the doping range can be designed from $1\times10^{17}$ to $5\times10^{19}$ atoms per cubic centimeter range. The internal electric filed will accelerate the photogenerated electrons toward the vacuum thereby increasing the quantum efficiency of the photocathode 106B. For example, in some embodiments, an amount of Indium may be included to create a photocathode that is sensitive to light which includes 1064 nm wavelengths. This may be useful in 1064 nm laser applications. These lasers can be used for medical purposes to remove lesions and tumors. Alternatively, these lasers can be used for cutting and/or etching. These lasers can be used for flow visualizations. These lasers can be used for laser rangefinders and/or laser guidance and laser painting systems.

Alternatively or additionally, embodiments may implement the active device absorber layer 516 having a near infrared spectrum of 900-1700 nm. This spectrum can be useful for laser range finders and designators as well as observation and detection of celestial bodies.

Alternatively or additionally, embodiments may implement the active device absorber layer 516 having a spectrum of 1.7 to 3 um. This is one spectrum that has been referred to as short wave infrared. Note that this is a useful spectrum and represents the limit of systems that can use glass optics as glass optics become non-functional above 3 um.

Unlike photodiodes (which are PN junction devices), T-mode photocathodes, such as the active device absorber layer 516 include only p-type bulk layers.

The active device absorber layer 516 may be formed via any practicable growth, deposition, or/or other process.

FIG. 6 further illustrates the window layer 518. A window layer 518 is a doped protective layer that protects the active device absorber layer 516. In particular, the window layer 518 provides passivation to prevent corrosion of the active device absorber layer 516. Note that while the window layer 518 is shown as an Arsenide type window layer, in some embodiments, a Phosphide window layer may be used to provide for better passivation than an Arsenide type window layer. The window layer 518 is doped such that it has a large band gap so as to not absorb light that is intended to reach the active device absorber layer 516. In some embodiments, the window layer 518 may be designed so as to reduce reflectivity of the active device absorber layer 516 to allow for more light to be absorbed by the active device absorber layer 516 than if a more reflective surface were present on the active device absorber layer 516.

Returning once again to FIG. 5, various finishing elements are illustrated. In particular, FIG. 5 illustrates that that an antireflective coating 520 is added over the window layer 518. A faceplate 522 is bonded to the photocathode. The faceplate 522, in this example is Corning 7056 glass. FIG. 5 further illustrates complete removal of InP substrate. This may be performed by etching, grinding, and/or other processes.

FIG. 5 illustrates that a Cs—O layer 524 may be added to create a negative electron affinity (NEA) surface. In an alternative embodiment, $Cs_2Te$ or CsF ($CsNF_3$ instead of Cs—O) may be used in place of Cs—O.

In some embodiments, the optional fully strained InP layer 514 may be added for better Cs—O activation and for electrons to tunnel though. In some embodiments, the optional InP layer is thinner than 5 nm. This thin InP layer acts as 1) a barrier for thermally generated electrons but passes energetic photogenerated electrons toward the vacuum via a quantum tunneling process; and 2) leverage to use known surface cleaning and activation processes to make a negative electron affinity (NEA) cathode. This layer is completely strained and sufficiently thin. Sufficiently thin means that photogenerated electrons can tunnel through this layer. The thickness of this layer can range from 2-10 nm.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
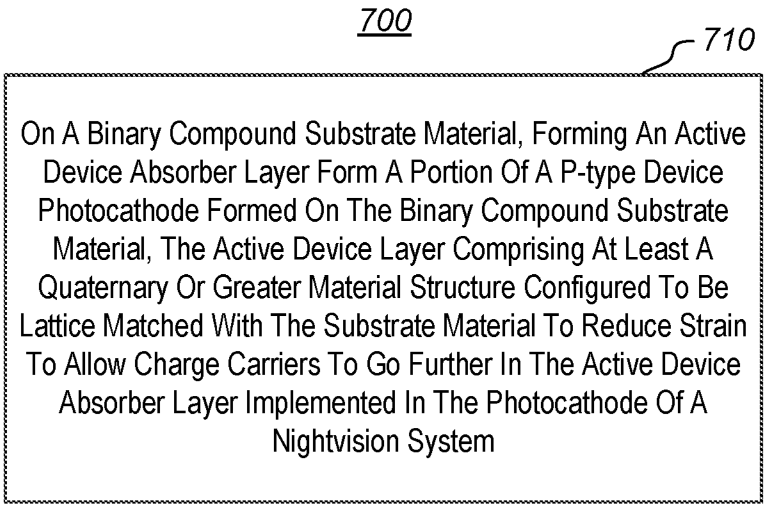
FIG. 7 illustrates a method of forming a lattice matched extended photocathode.

Referring now to FIG. 7, a method 700 is illustrated. The method 700 includes acts for forming a photocathode absorber. The method 700 includes on a binary compound substrate material, forming an active device absorber layer forming a portion of a p-type device photocathode formed on the binary compound substrate material, the active device absorber layer comprising at least a quaternary or greater material structure configured to be lattice matched with the substrate material to reduce strain to allow charge carriers to go further in the active device absorber layer implemented in the photocathode of a nightvision system (act 710).

The method 700 may be practiced where the substrate material is GaAs and the active device absorber layer is InGaAsNSb (such as is illustrated in FIG. 4) or where the substrate material is InP and the active device absorber layer is InGaAsP (as illustrated in FIG. 6). In some such embodiments, the method 700 may further include forming an InGaP etch stop layer to prevent surface damage on the active device absorber layer when the substrate material is GaAs (e.g., see layer 312 of FIG. 4) or forming an AlInAsP etch stop layer when the substrate layer is InP (e.g., see etch stop layer 512 of FIG. 6).

The method 700 may further include doping the active device absorber layer formed on the binary compound substrate material exponentially by p-type impurities with levels of doping increasing away from an interface between the active device absorber layer and the binary compound substrate material. In some such embodiments, the p-type impurities may include Be when the substrate material is GaAs (as illustrated in FIGS. 3 and 4). Alternatively, the p-type impurities may include Zn when the substrate material is InP (as illustrated in FIGS. 5 and 6).

The method 700 may further include forming a fully strained layer between an etch stop layer and the active device absorber layer. The fully strained layer may be a GaAs layer when the substrate material is GaAs (see e.g., FIG. 3) or a fully strained InP layer when the substrate material is InP (see e.g., FIG. 5). In some such embodiments, the method 700 may further include removing the substrate material and the etch stop layer and forming a Cs—O layer on the fully strained layer for activation.

The method 700 may further include forming window layer on the active device absorber layer.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A photocathode epitaxial structure comprising:

a binary compound substrate material; and an active device absorber layer forming a portion of a p-type device photocathode formed on the binary compound substrate material, the active device absorber layer comprising at least a quaternary or greater material structure configured to be lattice matched with the substrate material to reduce strain to allow charge carriers to go further in the active device absorber layer implemented in the photocathode of a nightvision system; and a selective barrier layer deposited on the active device absorber layer configured to act as a barrier for thermally generated electrons while freely passing energetic photogenerated electrons, wherein a thickness of the selective barrier layer is less than or equal to 10 nm.

2. The photocathode epitaxial structure of claim 1, wherein the substrate material is GaAs and the active device absorber layer is InGaAsNSb.

3. The photocathode epitaxial structure of claim 2, further comprising an InGaP etch stop layer to prevent surface damage.

4. The photocathode epitaxial structure of claim 1, wherein the substrate material is InP and the active device absorber layer is InGaAsP.

5. The photocathode epitaxial structure of claim 4, further comprising an AlInAsP etch stop layer.

6. The photocathode epitaxial structure of claim 1, wherein the active device absorber layer formed on the binary compound substrate material has a direct optical band gap of 1.4 to 0.7 eV at 300 Kelvin.

7. The photocathode epitaxial structure of claim 1, wherein the active device absorber layer formed on the binary compound substrate material detects optical wavelengths up to at least 1064 nm.

8. The photocathode epitaxial structure of claim 1, wherein the active device absorber layer formed on the binary compound substrate material detects optical wavelengths up to at least 1200 nm.

9. The photocathode epitaxial structure of claim 1, wherein the active device absorber layer formed on the binary compound substrate material detects optical wavelengths up to at least 1550 nm.

10. The photocathode epitaxial structure of claim 1, wherein the active device absorber layer formed on the binary compound substrate material is doped exponentially by p-type impurities with levels of doping increasing away from an interface between the active device absorber layer and the binary compound substrate material.

11. The photocathode epitaxial structure of claim 1, wherein the selective barrier layer comprises a fully strained GaAs or InP layer between an etch stop layer and the active device absorber layer.

12. The photocathode epitaxial structure of claim 11, further comprising a Cs—O layer on the fully strained layer for activation.

13. The photocathode epitaxial structure of claim 1, further comprising a window layer on the active device absorber layer.

14. A method of forming a photocathode absorber, the method comprising:

on a binary compound substrate material, forming an active device absorber layer forming a portion of a p-type device photocathode formed on the binary compound substrate material, the active device absorber layer comprising at least a quaternary or greater material structure configured to be lattice matched with the substrate material to reduce strain to allow charge carriers to go further in the active device absorber layer implemented in a photocathode of a nightvision system; and forming a selective barrier layer on the active device absorber layer that is configured to act as a barrier for thermally generated electrons while freely passing energetic photogenerated electrons, wherein a thickness of the selective barrier layer is less than or equal to 10 nm.

15. The method of claim 14, wherein the substrate material is GaAs and the active device absorber layer is InGaAsNSb or wherein the substrate material is InP and the active device absorber layer is InGaAsP.

16. The method of claim 15 further comprising forming an InGaP etch stop layer to prevent surface damage on the active device absorber layer when the substrate material is GaAs or forming an AlInAsP etch stop layer when the substrate layer is InP.

17. The method of claim 14, further comprising doping the active device absorber layer formed on the binary compound substrate material exponentially by p-type impurities with levels of doping increasing away from an interface between the active device absorber layer and the binary compound substrate material, and wherein the p-type impurities comprise Be when the substrate material is GaAs or the p-type impurities comprise Zn when the substrate material is InP.

18. The method of claim 14, wherein the step of forming the selective barrier layer comprises forming a fully strained GaAs layer when the substrate material is GaAs or a fully strained InP layer when the substrate material is InP, between an etch stop layer and the active device absorber layer.

19. The method of claim 18, further comprising: removing the substrate material and the etch stop layer; and forming a Cs—O layer on the fully strained GaAs layer or the fully strained InP layer for activation.

20. The method of claim 14, further comprising forming a window layer on the active device absorber layer.

* * * * *